United States Patent [19]

Polacek

[11] Patent Number: 5,385,597

[45] Date of Patent: Jan. 31, 1995

[54] SAFETY DEVICE FOR A DRIVE UNIT OF A VIBRATION ROLLER

[75] Inventor: Manfred Polacek, Germering, Germany

[73] Assignee: Wacker-Werke GmbH & Co KG, Reichertshofen, Germany

[21] Appl. No.: 30,357

[22] PCT Filed: Aug. 9, 1992

[86] PCT No.: PCT/EP92/01815

§ 371 Date: Mar. 19, 1993

§ 102(e) Date: Mar. 19, 1993

[87] PCT Pub. No.: WO93/03226

PCT Pub. Date: Feb. 18, 1993

[30] Foreign Application Priority Data

Aug. 10, 1991 [DE] Germany .................. 4126488

[51] Int. Cl.$^6$ ............... G05G 1/04; G05G 5/06
[52] U.S. Cl. ........................ 74/523; 74/528; 74/501.6; 74/527
[58] Field of Search .............. 74/527, 528, 529, 543, 74/523, 500.5, 501.5 R, 502, 519, 557

[56] References Cited

U.S. PATENT DOCUMENTS

| 2,670,824 | 3/1954 | Banker | 74/527 |
| 3,525,272 | 8/1970 | Olson | 73/528 |
| 4,949,591 | 8/1990 | Roelle | 74/519 X |
| 4,949,830 | 8/1990 | Kemner et al. | 74/523 X |
| 5,000,059 | 3/1991 | Barnard | 74/500.5 X |
| 5,214,980 | 6/1993 | Saeda et al. | 74/528 X |
| 5,235,869 | 8/1993 | Nyezdatny | 74/523 X |

FOREIGN PATENT DOCUMENTS

| 0053215 | 11/1980 | European Pat. Off. | 74/528 |
| 3442083 | 11/1984 | Germany | 74/528 |
| 1695280 | 11/1991 | U.S.S.R. | 74/523 |

Primary Examiner—Vinh T. Luong
Attorney, Agent, or Firm—Robert W. Becker & Associates

[57] ABSTRACT

The safety device for a drive unit of a vibration roller has a locking bar displaceable between a switch-off position and a locking position and is biased into its switch-off position. The drive unit is forcibly switched off when the locking bar is in its switch-off position. A switch lever is provided for manually operating the drive unit and can be coupled to a toothed rack with a coupling. The toothed rack is connected with a control cable to the drive unit and is biased into a position in which the drive unit is inoperative. A spring biases the coupling into a disengaged position in which the switch lever is disengaged from the toothed rack. The coupling is switchable from the disengaged position into an engaged position for operatively connecting the switch lever and the toothed rack and further into a locked engaged position. A device for blocking the toothed rack and the switch lever in the locked engaged position has a first toothed disk connected to the switch lever and a second disk connected to the locking bar. The second disk has an end face with an elastomer coating cooperating with the teeth of the first disk.

3 Claims, 3 Drawing Sheets

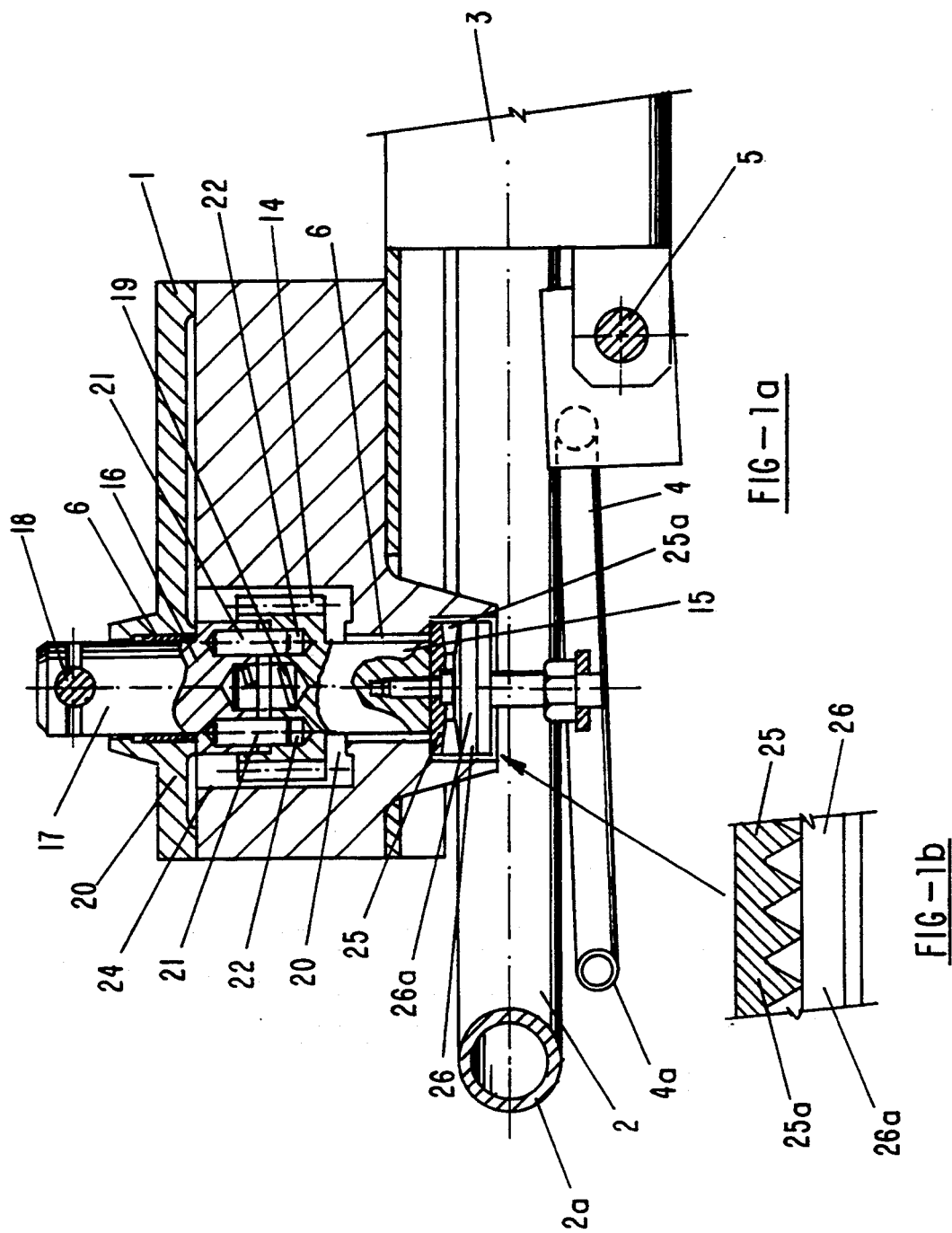

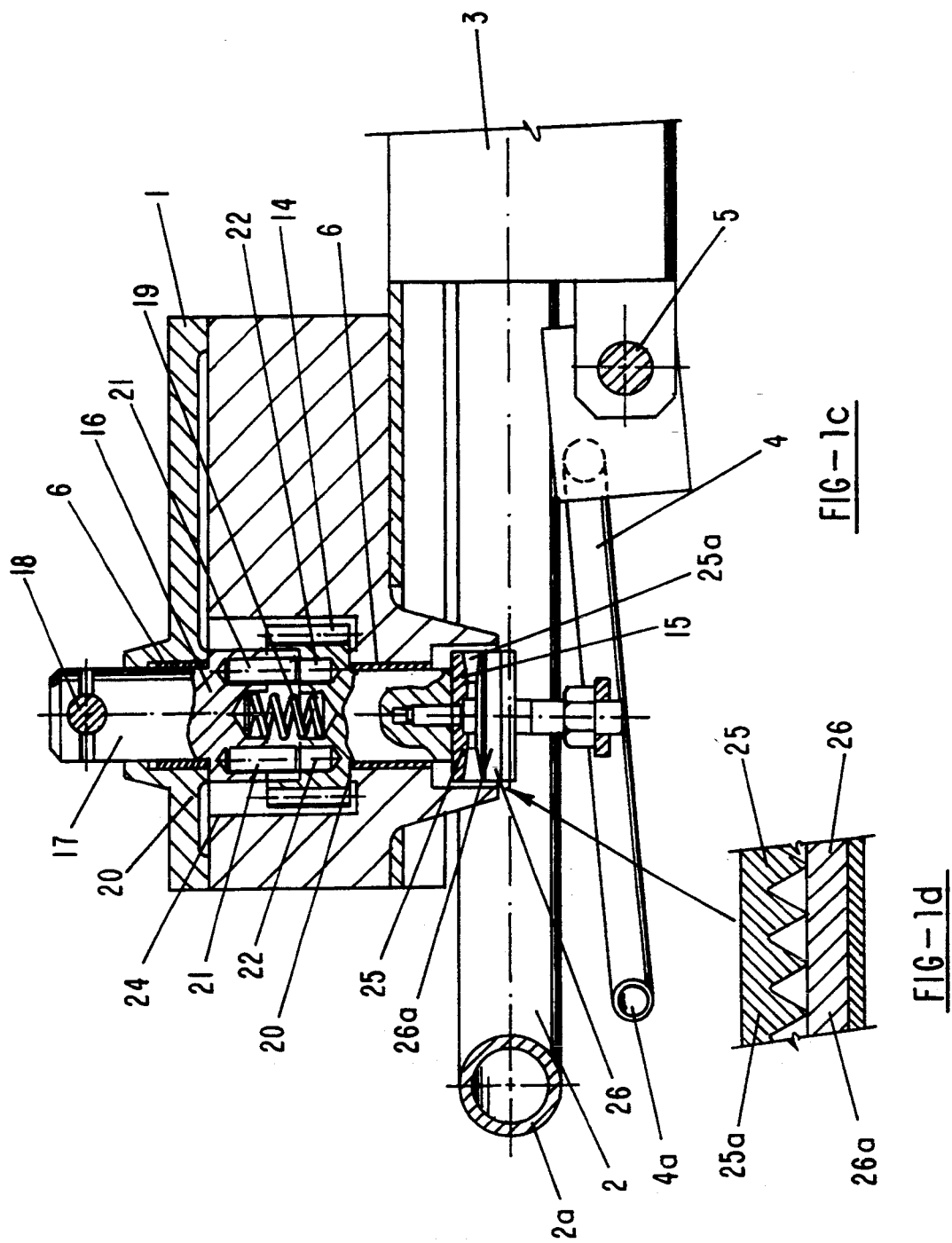

SAFETY DEVICE FOR A DRIVE UNIT OF A VIBRATION ROLLER

BACKGROUND OF THE INVENTION

The invention relates to a safety device for the drive unit of a vibration roller that has a switch lever for manually operation the drive unit, whereby the drive unit is forcibly switched off when a locking bar is in its switch-off position, from which it can be moved by an operator for operating and driving the roller against a permanent return force into a release position.

Safety devices of this kind are known from German Patent 34 42 083 C2.

In the known safety devices the blocking device in a first embodiment is comprised of a locking pawl that connects the coupling device with the control element and the switch lever in a form-fitting manner to a stationary housing as soon as it is moved into the locked engaged position with the locking bar by the operator. In a second embodiment the blocking device is comprised of a Hirth toothing one part of which is fixedly connected with the coupling device and the other part is fixedly connected to the housing whereby both parts, after displacement of the coupling device with the locking bar by the operator into the locked engaged position, come into contact.

When employing the first mentioned, constructively especially simple embodiment, the operator must pay close attention that, on the one hand, the normal engaged position of the coupling and not the disengaged position is adjusted when changes at the drive unit are performed. These difficulties are prevented with the aforementioned second embodiment having a blocking device with a Hirth toothing because the operator can move the switch lever in the engaged position of the coupling with a somewhat increased force expenditure when he slightly releases the force with which he supports the locking bar in its release position. The second embodiment however has the disadvantage that it requires an increased constructive expenditure and allows only a stepwise change at the drive unit.

It is an object of the invention to provide a safety device according to the preamble of claim 1 which is characterized by a simple construction as well as by the possibility of a continuous change of the drive unit.

SUMMARY OF THE INVENTION

The safety device of the present invention is primarily characterized by the following features:

a locking bar having a switch-off position and a locking position, comprising a first means for biasing the locking bar into its switch-off position and having an abutment for defining the locking position, the locking bar displaceable from the switch-off position into the locking position for operating the drive unit;

a switch lever for manually operating the drive unit, with the drive unit being forcibly switched off when the locking bar is in its switch-off position;

a control element in the form of a toothed rack, the control element actuated by the switch lever, the control element having a second means for biasing the control element into a zero position in which zero position the drive unit is inoperative;

an actuating device for the drive unit in the form of a control cable connected to the control element and the drive unit;

a switchable coupling connected between the control element and the switch lever, the coupling comprising a spring biasing the coupling into a disengaged position in which disengaged position the switch lever is freely movable and disengaged from the control element, and the coupling being switchable consecutively from the disengaged position into an engaged position for operatively connecting the switch lever and the control element and further into a locked engaged position with the locking bar, during movement from the switch-off position to the locking position of the locking bar; and a blocking device comprising a first disk with an end face having teeth, the first disk connected to the switch lever in the locked engaged position and rotatable with the switch lever, and a second disk connected to the locking bar having an end face with an elastomer coating oppositely arranged to the end face having teeth, wherein in the locked engaged position of the coupling the control element and the switch lever are blocked at least against displacement by the second means for biasing and the spring by the blocking device.

Preferably, the second disk is adjustable relative to the locking bar. The locking bar has a handle portion extending parallel to a guide bracket of the guiding center pole, the handle portion spaced from the guide bracket in the switch-off position and the locking position.

In the inventive safety device the operator must only release the force exerted for supporting the locking bar in its release position, as is known from the safety device with the Hirth toothing as a blocking device, when he desires to displace the switch lever in the engaged position of the coupling device for adjusting the drive unit, and he is able to adjust the drive unit in a continuous manner, in contrast to the known safety device. A slight release movement of the locking bar is already sufficient in order to be able to move the switch lever with a moderate force expenditure. Furthermore, the blocking device in the inventive safety device is constructively substantially simpler than the known safety device with the Hirth toothing.

BRIEF DESCRIPTION OF THE DRAWINGS

The invention will be described in the following with the aid of the drawings of one particular embodiment.

The drawings show in:

FIGS. 1a and 1b show the safety device from the side in a longitudinal section in switch-off position of the locking bar with FIG. 1b showing an enlarged segment of FIG. 1a FIGS. 1c and 1d show the safety device from the side in a longitudinal section and showing the locking position of the locking bar with FIG. 1d show an enlarged segment of FIG. 1c;

DESCRIPTION OF PREFERRED EMBODIMENTS

Figure 2:
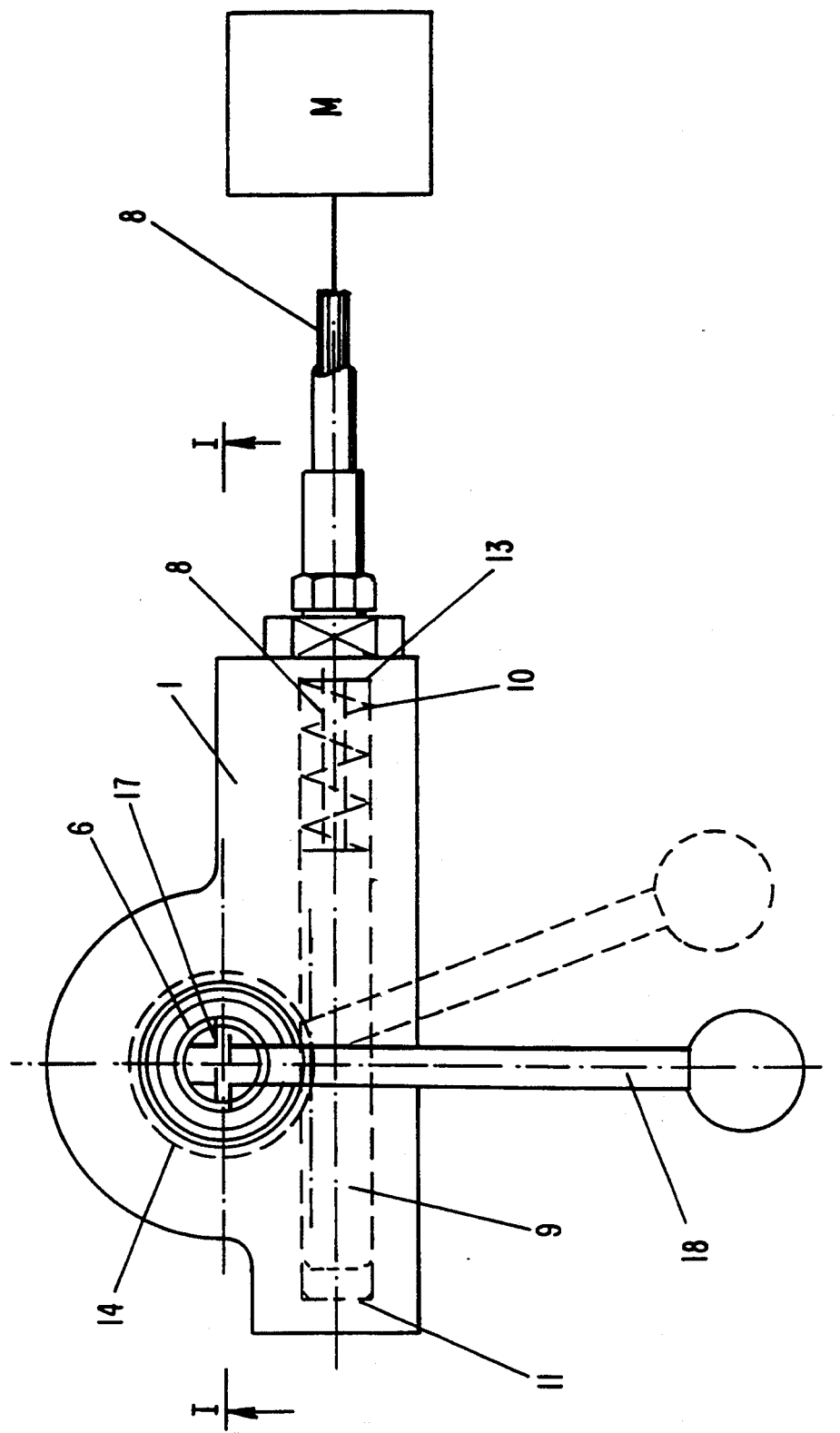

The safety device according to FIGS. 1 to 4 has a housing 1a, 1b which is rigidly connected to a vibration roller in the area of a guide bracket 2, whereby of the vibration roller in FIGS. 1a, 1b with the exception of the guide bracket 2, only the end of a center pole 3 for manually guiding the vibration roller is shown to which the guide bracket 2 is connected. A locking bar 4 is pivotably connected to the center pole 3 such that it attains an angular position relative to the guide bracket 2 when no force is exerted whereby in this angular position the remote end 4a is lower than the handle 2a of the bracket 2. As can be seen in FIG. 4, the outer contour of the locking bar 4 is positioned within the inner contour of the guide bracket 2 in a switch-off position shown in FIGS. 1a and 3 as well as in any other position and its release (locking position, shown in FIG. 1b ) position in which it essentially extends parallel to the guide bracket 2. This has the advantage that the operator cannot jam his fingers between the locking bar 4 and the guide bracket 2. The locking bar 4 is pivotable about a pivoting axis. The switch-off position and the further positions of the locking bar 4 will be explained infra.

The housing 1 has a transverse bore 6 and is connected such to the vibration roller that the transverse bore 6 is above a part 26 of a blocking device connected to the locking bar 4 and explained in detail infra.

According to FIG. 2, a Bowden cable 8 connected to the drive m, for example, a hydro pump, of the vibration roller extends into the housing 1. The Bowden cable 8 is fixedly connected to a toothed rack 9, only schematically shown in the drawing, that is longitudinally slidable within the housing 1 and is biased by a second means of biasing in the form of spring 10 abutting against the toothed rack 9 and a housing surface 13, into an inwardly oriented end position zero position which is determined by a housing abutment 11.

The toothed rack 9 meshes with a gear wheel 14 which is rotatably supported at the lower inwardly facing portion of the transverse bore 6 (see FIGS. 1a, 1b on an axle 15 which extends downwardly from the housing 1. At the lower end a first disk 25 is connected to the end face of the axle 15 and has teeth 25a connected to its free end face that are coaxial to the axle 15 and which are oppositely arranged to a second disk 26 which is form-fittingly but height-adjustably connected with the locking bar 4. The second disk 26 has on its side facing the teeth 25a a coating 26a of an elastomer material fixedly connected thereto. The gear wheel 14 together with the axle 15 is movable back and forth within the limits of the housing 1 by the locking bar 4 and has a height such that it remains in mesh with the toothed rack 9 at all times.

A rotary head 16 is positioned above the gear wheel 14 and is fixedly connected to a shaft 17 aligned with the axle 15 which is rotatably supported within the upper portion of the transverse bore 6 (see FIGS. 1a, 1b) and extends past the housing 1 in an upward direction. A switch lever 18 is connected outside the housing to the shaft 17 and extends perpendicular to the shaft.

Between the rotary head 16 and the gear wheel 14 a pressure spring 19 is arranged which forces apart these two parts in the axial direction of the axle 15 and the shaft 17 and forces them into contact with the abutment surfaces 20 of the housing.

Parallel to the axial direction of the shaft 17 two coupling pins 21 extend from the free end face of the rotary head 16 toward the gear wheel 14. The gear wheel 14 has two blind holes 22 cooperating with the coupling pins 21 into which the pins 21 in a predetermined relative angular position between the gear wheel 14 and the rotary head 16 engage when the gear wheel 14 is lifted by the locking bar 4 via the axle 15 against the force of the spring 19 toward the rotary head 16. The arrangement is such that the pins 21 are positioned just outside of the blind holes 22 when the locking bar 4 reaches the lowest position represented in FIG. 1a, i.e., the switch-off position. The gear wheel 14 with the blind holes 22 and the rotary head 16 with the pins 21 together form a switchable coupling that is actuatable by the locking bar 4 via which coupling the switch lever 18 and the toothed rack 9, representing the control element of the device, can be form-fittingly connected. Such a connection is achieved by lifting the locking bar 4 from its position represented in FIGS. 1a and 3 whereby initially a normal engaged position for the following movement between the switch lever 18 and the toothed rack 9 is reached. By lifting the locking bar 4 further, the teeth 25a are forced into the coating 26a to an increasingly greater extent due to the increasing counter pressure of the spring 19 and then from the upper abutment 20 so that finally the lever 18 is practically locked when the locking bar reaches its upper position, i.e., the locking position (locking position for the coupling and release position (see FIG. 1b ) for the drive unit).

The safety device according to FIGS. 1a, 1b 4 operated as follows:

In the position of the locking bar 4 shown in FIG. 1a the toothed rack 9 is in its initial position zero position under the force of the spring 10 in which the Bowden cable 8 turns off the drive unit. The coupling 24 is disengaged and the switch lever 18 can be moved without also moving the gear wheel 14 and with it the toothed rack 9. When the locking bar 4 is slightly lifted, the coupling 24 is moved into the normal engaged position in which the switch lever 18 can be moved in a continuous manner into any desired drive position needed for the required drive velocity by engaging the gear wheel 14 and the toothed rack 9. As soon as this position has been reached, the operator lifts the locking bar into its upper end position, the locking position for the coupling in which the coupling 24 is locked against rotation and the switch lever 18 as well as the toothed rack 9 are blocked in their previously described position. When the locking bar 4 is released for any reason by the operator, it is immediately returned into its initial switch-off position by its own weight (first means for biasing and also by the force of the spring 19. Simultaneously, the coupling 24 is disengaged so that the spring 10 returns the toothed rack 9 due to the freely rotatable gear wheel 14 into the inward end position zero position represented in FIG. 2 so that the drive unit is switched off by the Bowden cable 8. The position of the locking bar 4 represented in FIG. 1a is thus its switch-off position.

For the drive-effecting operation of the switch lever 18 the operator must first adjust the locking bar 4 into the normal engaged position of the coupling 24, but must take care that the pressure between the teeth 25a and the coating 26a does not become too great so that the locking position is not reached erroneously. This makes it impossible that the locking bar be simply tied to the guide bracket 2. Furthermore, it is not attractive for the operator to fix the locking bar in a position in which the normal engagement of the coupling 24 is reached because in this normal engaged position of the coupling 24 the spring 10 exerts torque on the lever 18 via the toothed rack 9 and the gear wheel 14 which torque must be permanently countered by the operator for a correspondingly fixed locking bar 4 while otherwise after completion of the adjustment this torque can be avoided by lifting the locking bar 4 up to the bracket 2 into its locking position.

By respectively selecting the forces of the spring 10 and 19 it is thus easily possible to provide a situation in which it is much more inconvenient for the operator to continuously hold the switch lever 18 against a torque than to lift the locking bar 4 into its locking position.

Preferably, the disk 25 is adjusted relative to the locking bar 4 such that the teeth 25a and the elastomer coating 26a in the switch-off position of the locking bar 4 have a substantial distance from one another.

The present invention is, of course, in no way restricted to the specific disclosure of the specification and drawings, but also encompasses any modification within the scope of the appended claims.

I claim:

1. A safety device for a drive unit of a vibration roller with a guiding center pole, said safety device comprising:
   a locking bar having a switch-off position and a locking position, said locking bar comprising a first means for biasing said locking bar into said switch-off position and having an abutment for defining said locking position, said locking bar displaceable from said switch-off position into said locking position for operating the drive unit;
   a switch lever for manually operating the drive unit, with the drive unit being forcibly switched off when said locking bar is in said switch-off position;
   a control element in the form of a toothed rack, said control element actuated by said switch lever, said control element having a second means for biasing said control element into a zero position in which zero position the drive unit is inoperative;
   an actuating device for the drive unit in the form of a control cable connected to said control element and the drive unit:
   a switchable coupling connected between said control element and said switch lever, said coupling comprising a spring biasing said coupling into a disengaged position in which disengaged position said switch lever is freely movable and disengaged from said control element, and said coupling being switchable consecutively from said disengaged position into an engaged position for operatively connecting said switch lever and said control element and further into a locked engaged position with said locking bar, during movement from said switch-off position to said locking position of said locking bar; and
   a blocking device comprising a first disk with an end face having teeth, said first disk connected to said switch lever in said locked engaged position so as to be rotated with said switch lever, and a second disk connected to said locking bar having an end face with an elastomer coating oppositely arranged to said end face having teeth, wherein in said locked engaged position of said coupling said control element and said switch lever are blocked at least against displacement by said second means for biasing and said spring by said blocking device.

2. A safety device according to claim 1, wherein said second disk is adjustable relative to said locking bar.

3. A safety device according to claim 1, wherein said locking bar has a handle portion extending parallel to a guide bracket of the guiding center pole, said handle portion spaced from the guide bracket in said switch-off position and said locking position.

* * * * *